(12) United States Patent
Bloodworth et al.

(10) Patent No.: US 7,734,138 B2
(45) Date of Patent: Jun. 8, 2010

(54) FIBER OPTIC CONNECTOR HOLDERS

(75) Inventors: Stephen Guy Bloodworth, Ft. Worth, TX (US); Cesar Geronimo Garcia, North Richland Hills, TX (US); William Julius McPhil Giraud, Springtown, TX (US); Todd Edward Mitchell, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/880,267

(22) Filed: Jul. 20, 2007

(65) Prior Publication Data

US 2008/0298764 A1 Dec. 4, 2008

Related U.S. Application Data

(60) Provisional application No. 60/932,219, filed on May 30, 2007.

(51) Int. Cl.
*G02B 6/00* (2006.01)
*G02B 6/36* (2006.01)

(52) U.S. Cl. .................. 385/136; 385/76; 385/86; 385/87; 385/134; 385/137

(58) Field of Classification Search ............ 385/87, 385/135, 137, 139
See application file for complete search history.

(56) References Cited

U.S. PATENT DOCUMENTS

| 4,736,100 A | | 4/1988 | Vastagh ...................... 250/277 |
| 4,986,762 A | * | 1/1991 | Keith ......................... 439/131 |
| 4,995,688 A | | 2/1991 | Anton et al. ................ 350/96.1 |
| 5,052,775 A | * | 10/1991 | Bossard et al. ................ 385/76 |
| 5,073,042 A | | 12/1991 | Mulholland et al. ........... 385/69 |
| 5,076,688 A | | 12/1991 | Bowen et al. ............... 356/73.1 |
| 5,142,598 A | | 8/1992 | Tabone ........................ 385/78 |

(Continued)

FOREIGN PATENT DOCUMENTS

EP 0871047 A1 10/1988

(Continued)

OTHER PUBLICATIONS

Patent Cooperation Treaty, International Search Report for International Application No. PCT/US2008/006748, Sep. 10, 2008, 2 pages.

(Continued)

*Primary Examiner*—Ryan Lepisto
(74) *Attorney, Agent, or Firm*—John H. Vynalek

(57) ABSTRACT

There is provided a fiber optic connector holder adapted to selectively retain two or more fiber optic connectors that include a dust cap on the ferrule. The connector holder comprises a boot retainer to selectively retain a portion of the boot of the connector, and the connector holder comprises a dust cap retainer to selectively retain a portion of the dust cap of the connector. The connector holder is provided in a telecommunications enclosure to provide convenient parking for fiber optic connectors that are not optically connected within a distribution field or the like or that are generally not in service at the time. The connector holders may be selectively installed and/or removed from the telecommunications enclosure to assist in the installation of new fiber optic hardware, such as splitter modules.

19 Claims, 12 Drawing Sheets

U.S. PATENT DOCUMENTS

| | | | |
|---|---|---|---|
| 5,708,742 A | 1/1998 | Beun et al. ................... 385/53 |
| 5,949,946 A * | 9/1999 | Debortoli et al. ............ 385/134 |
| 6,236,795 B1 * | 5/2001 | Rodgers ...................... 385/134 |
| 6,591,051 B2 * | 7/2003 | Solheid et al. ............... 385/134 |
| 6,592,266 B1 * | 7/2003 | Hankins et al. ............... 385/53 |
| 6,709,284 B1 | 3/2004 | Avlonitis ..................... 439/457 |
| 6,826,346 B2 * | 11/2004 | Sloan et al. .................. 385/136 |
| 7,190,874 B1 * | 3/2007 | Barth et al. .................. 385/135 |
| 7,198,409 B2 | 4/2007 | Smith et al. ................... 385/53 |
| 7,233,431 B2 | 6/2007 | Bayart et al. ................. 359/334 |
| 7,233,731 B2 | 6/2007 | Solheid et al. ............... 385/135 |
| 7,287,913 B2 * | 10/2007 | Keenum et al. ............... 385/76 |
| 7,407,330 B2 | 8/2008 | Smith et al. ................... 385/53 |
| 7,457,503 B2 | 11/2008 | Solheid et al. ............... 385/135 |
| 2004/0264873 A1 | 12/2004 | Smith et al. ................... 385/53 |
| 2005/0281526 A1 | 12/2005 | Vongseng et al. ............ 385/135 |
| 2006/0008231 A1 | 1/2006 | Reagan et al. ................ 385/135 |
| 2007/0025674 A1 * | 2/2007 | Kowalczyk et al. ......... 385/134 |
| 2007/0104450 A1 * | 5/2007 | Phung et al. ................. 385/137 |
| 2007/0165995 A1 * | 7/2007 | Reagan et al. ................ 385/135 |
| 2007/0189692 A1 * | 8/2007 | Zimmel et al. ............... 385/135 |

FOREIGN PATENT DOCUMENTS

| | | |
|---|---|---|
| EP | 0975180 A1 | 1/2000 |
| EP | 1045267 A1 | 10/2000 |
| EP | 0788002 A1 | 1/2007 |
| JP | 63-229409 | 9/1988 |
| WO | 98/53374 A2 | 11/1998 |
| WO | 00/75706 A2 | 12/2000 |
| WO | 02/103429 A2 | 12/2002 |

OTHER PUBLICATIONS

Corning Cable Systems LLC, Standard Recommended Procedure, SRP-003-744, Issue 1, Feb. 2007, 4 pages.

* cited by examiner

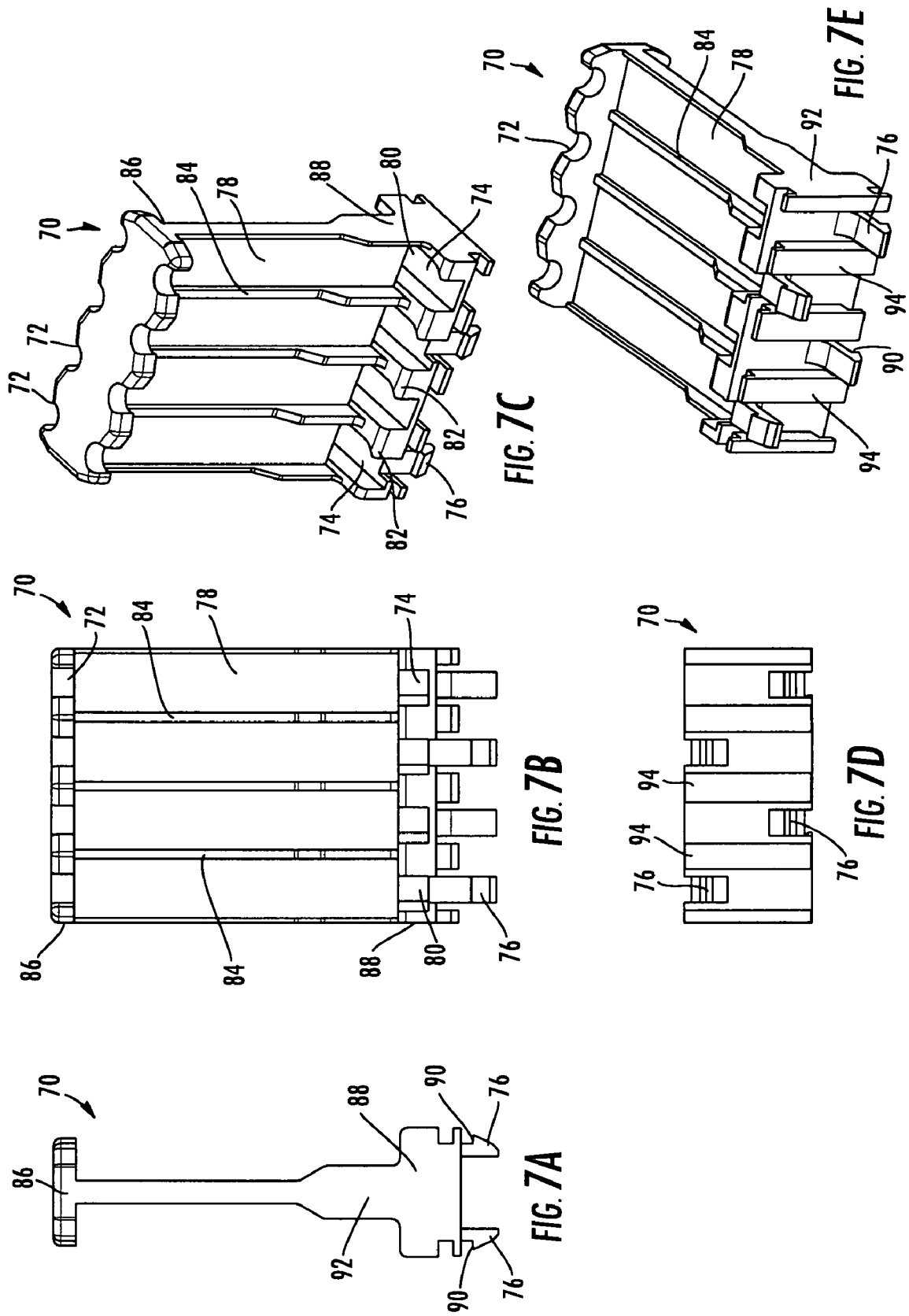

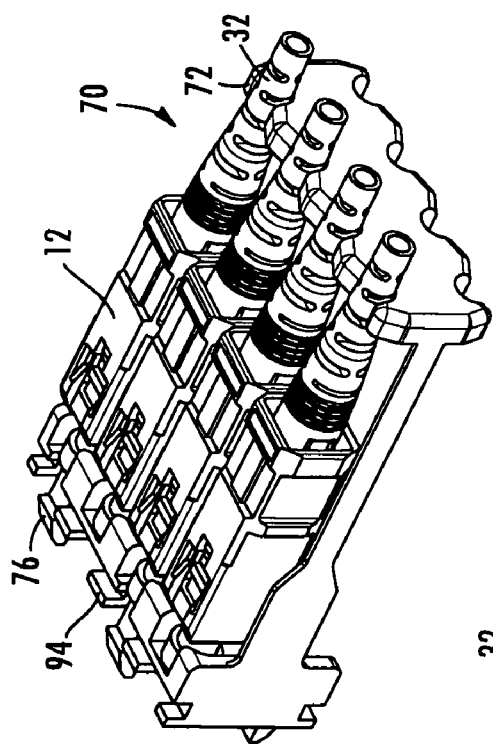
FIG. 8A
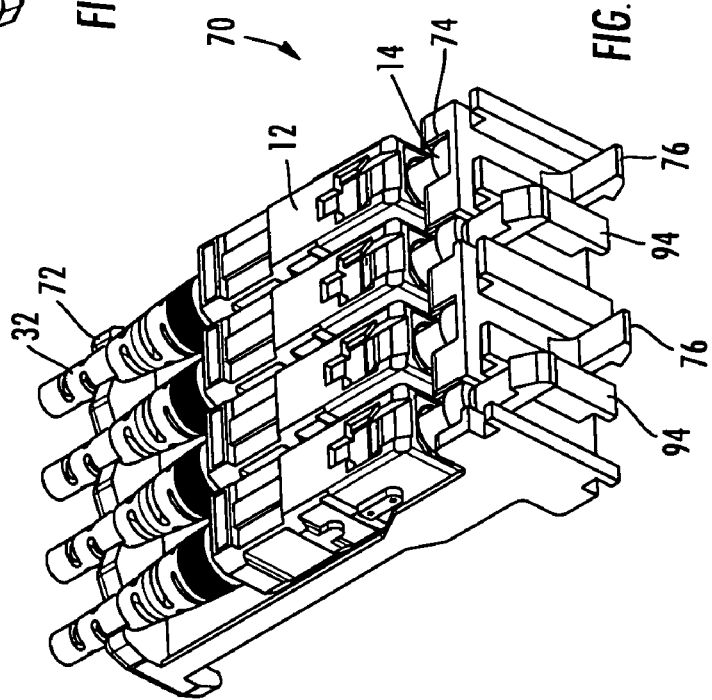
FIG. 8B
FIG. 8C
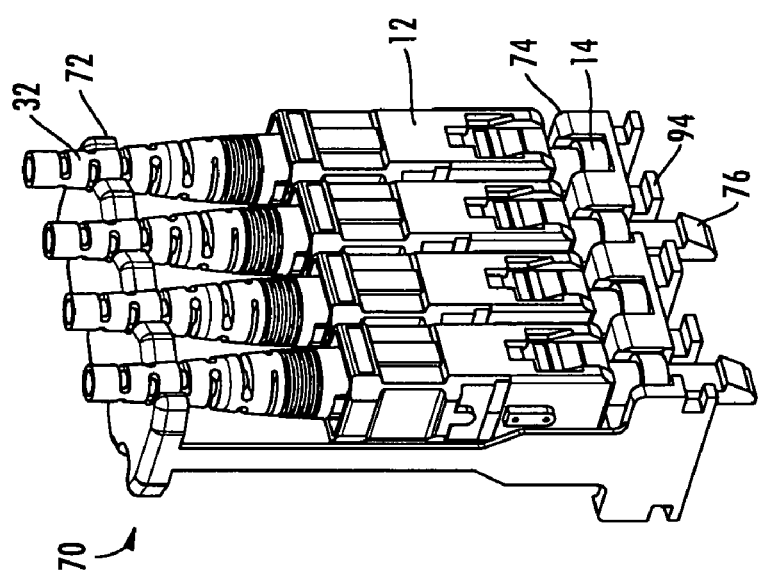

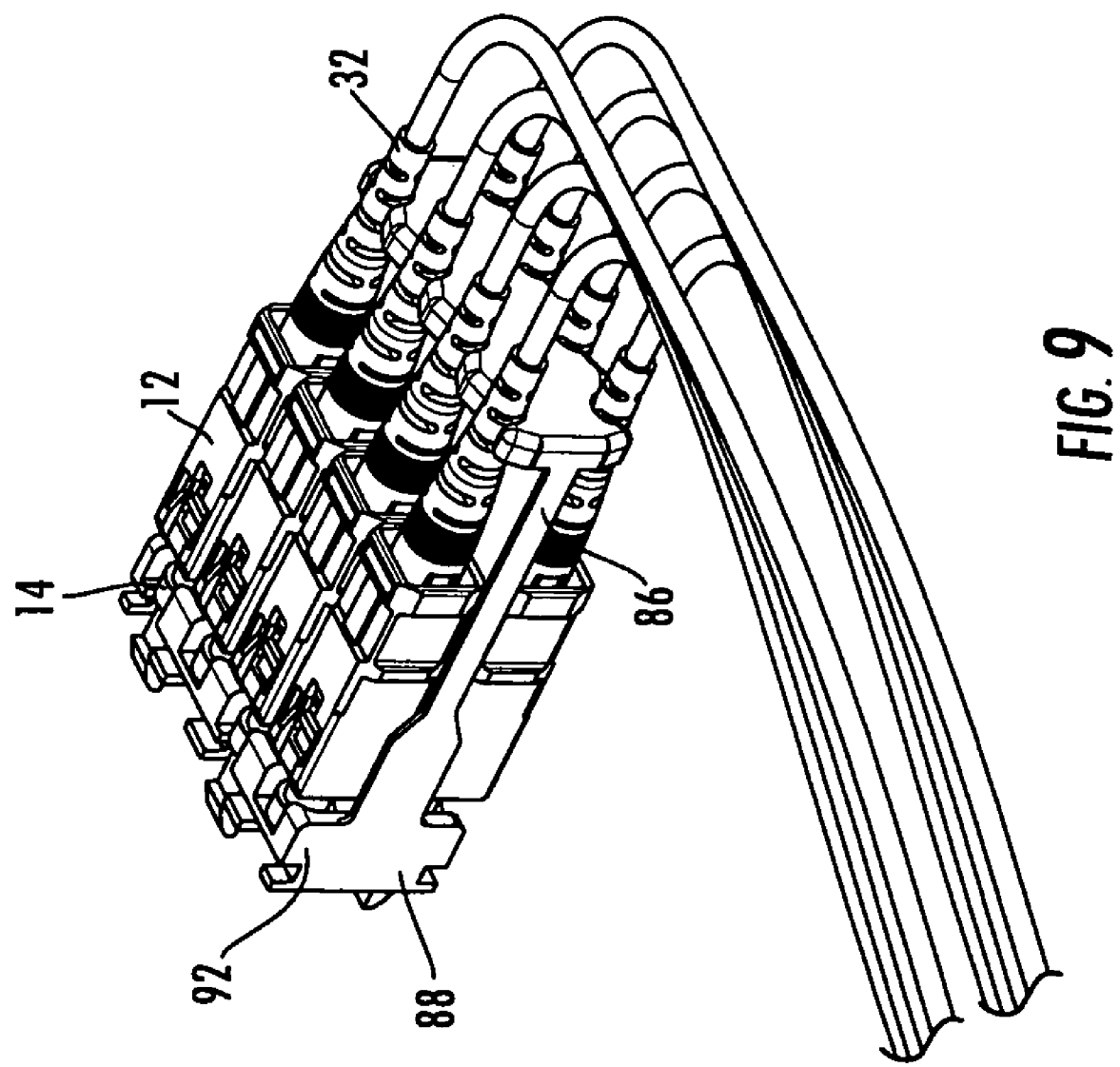

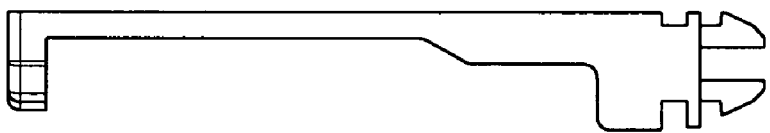
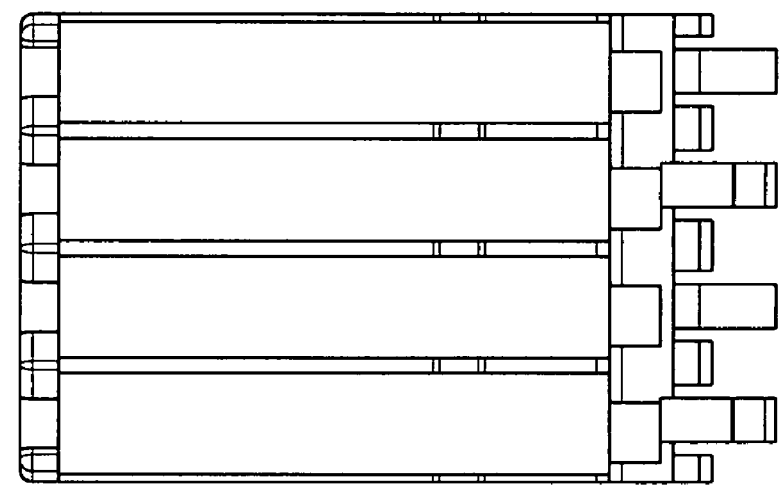
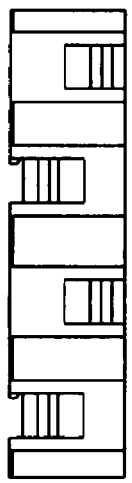
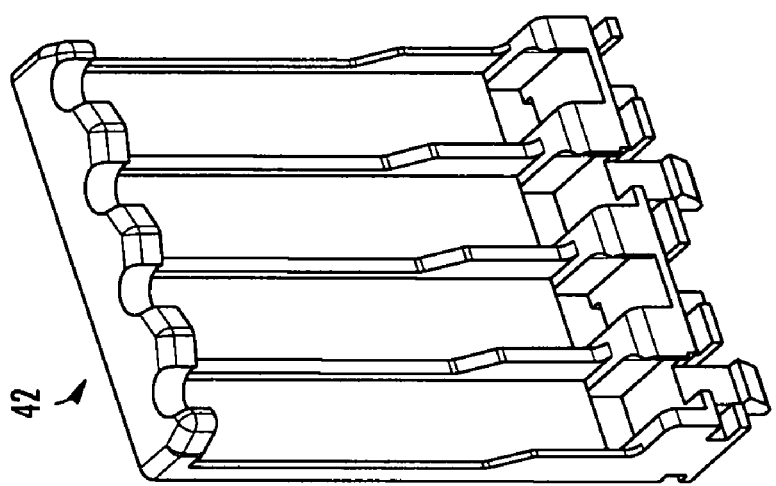
FIG. 12C
FIG. 12B
FIG. 12D
FIG. 12A

FIBER OPTIC CONNECTOR HOLDERS

CROSS-REFERENCE TO RELATED APPLICATION

The present application claims priority pursuant to 35 U.S.C. 119(e) to U.S. Provisional Application Ser. No. 60/932,219, filed May 30, 2007.

BACKGROUND OF THE INVENTION

1. Field of the Invention

The present invention is related to fiber optic connector holders, and more particularly, to devices adapted to selectively hold unused fiber optic connectors.

2. Description of Related Art

Telecommunications enclosures are commonly used at local convergence points or network access points to optically connect fiber optic cables in order for optical signals to be routed as desired. Some telecommunications enclosures include connectorized (either in the field or in the factory) fiber optic cables that may be selectively optically connected to one another, such as with an adapter. Such connections, as in a distribution field or the like, may be provided to enable a service provider to selectively connect or disconnect particular subscribers who request service or cancel service, respectively.

Although such selective connections are typically made within the telecommunications enclosures, the end faces of the ferrule (and optical fiber) are usually protected by a dust cap until the connector is ready to be inserted into an adapter or is otherwise optically connected. The dust cap generally protects the ferrule and fiber from scratches, other damage, and/or the collection of dust or debris, all of which could adversely affect the optical signal passing through the subsequent optical connection.

As a telecommunications enclosure may include dozens or hundreds of loose, unconnected fiber optic connectors that are reserved for future connections to provide subscribers service, telecommunications enclosures typically include fiber routing guides and/or connector holders to organize the loose, unconnected fiber optic connectors and cables. This organization of the connectors and/or cables is important as it 1) enables a technician to quickly and easily find the particular connector/cable desired to be connected, 2) enables the connectors to be safely stored to minimize the likelihood of damage to the connector cable, and/or 3) allows the connectors and cables to be stored in such a way that they do not interfere with other service work the technician may need to do within the enclosure.

Some conventional telecommunications enclosures include fiber optic cables that are grouped together with tie-wraps or the like, which may not provide adequate protection to the connectors and/or dust caps. Further enclosures include connector holders that gang a group of connectors together but that are free to dangle with the cables looped around routing guides, which may not allow a technician to quickly and conveniently find the particular connector and/or connectors needed at the time. Still further enclosures include connector holders mounted to a panel in the interior cavity of the enclosure; however, such connector holders are shaped like adapters such that they may be difficult for technicians to conveniently insert the connector into and/or remove the connector from the adapter. In addition, such connector holders typically occupy a relatively large area thus reducing the number of connectors that can be held and/or requiring the enclosure to be larger than desired. An example of such connector holder 2 is provided in FIG. 1, wherein the connector holder is adapted to selectively receive four individual fiber optic connectors (not shown).

Therefore, a need exists for a fiber optic connector holder than allows for safe and secure selective retention of fiber optic connectors while allowing the connectors to be quickly and conveniently removed as desired and requiring less volume within the interior cavity of the telecommunications enclosure.

BRIEF SUMMARY OF THE INVENTION

The various embodiments of the present invention address the above needs and achieve other advantages by providing a fiber optic connector holder that securely retains fiber optic connectors within the enclosure. The connector holders allow a technician to easily grasp the body of the connector when inserting the connector into the connector holder and/or when removing the connector from the connector holder. Furthermore, the connector holders of the present invention allow more connectors to be retained in a given volume, relative to prior art connector holders.

At least one embodiment of the present invention provides a fiber optic connector holder adapted to selectively retain two or more fiber optic connectors that include a dust cap generally protecting a ferrule of the connector. The connector holder comprises a body having an upper portion and a lower portion, and the lower portion of the body defines a base of the connector holder. The connector holder also includes a boot retainer adapted to selectively retain at least a portion of the boot of a fiber optic connector and includes a dust cap retainer adapted to selectively retain at least a portion of the dust cap. A holder retainer generally extends from the base of the fiber optic connector holder to enable the connector holder to be joined to surfaces, such as a panel of a telecommunications enclosure.

Further embodiments of the present invention provide telecommunications enclosures, such as FDHs, that include one or more of the fiber optic connector holders of the type described above. The telecommunications enclosures include panels on a swing-out frame or a swing-out tray to provide a technician with convenient access to the retained fiber optic connectors.

Still further embodiments of the present invention provide methods for organizing fiber optic connectors within a telecommunications enclosure using various connector holders of the present invention. Therefore, the connector holders and methods of various embodiments of the present invention provide for safe, convenient, and space-saving retention of fiber optic connectors within the telecommunications enclosure.

BRIEF DESCRIPTION OF THE SEVERAL VIEWS OF THE DRAWINGS

Figure 1:
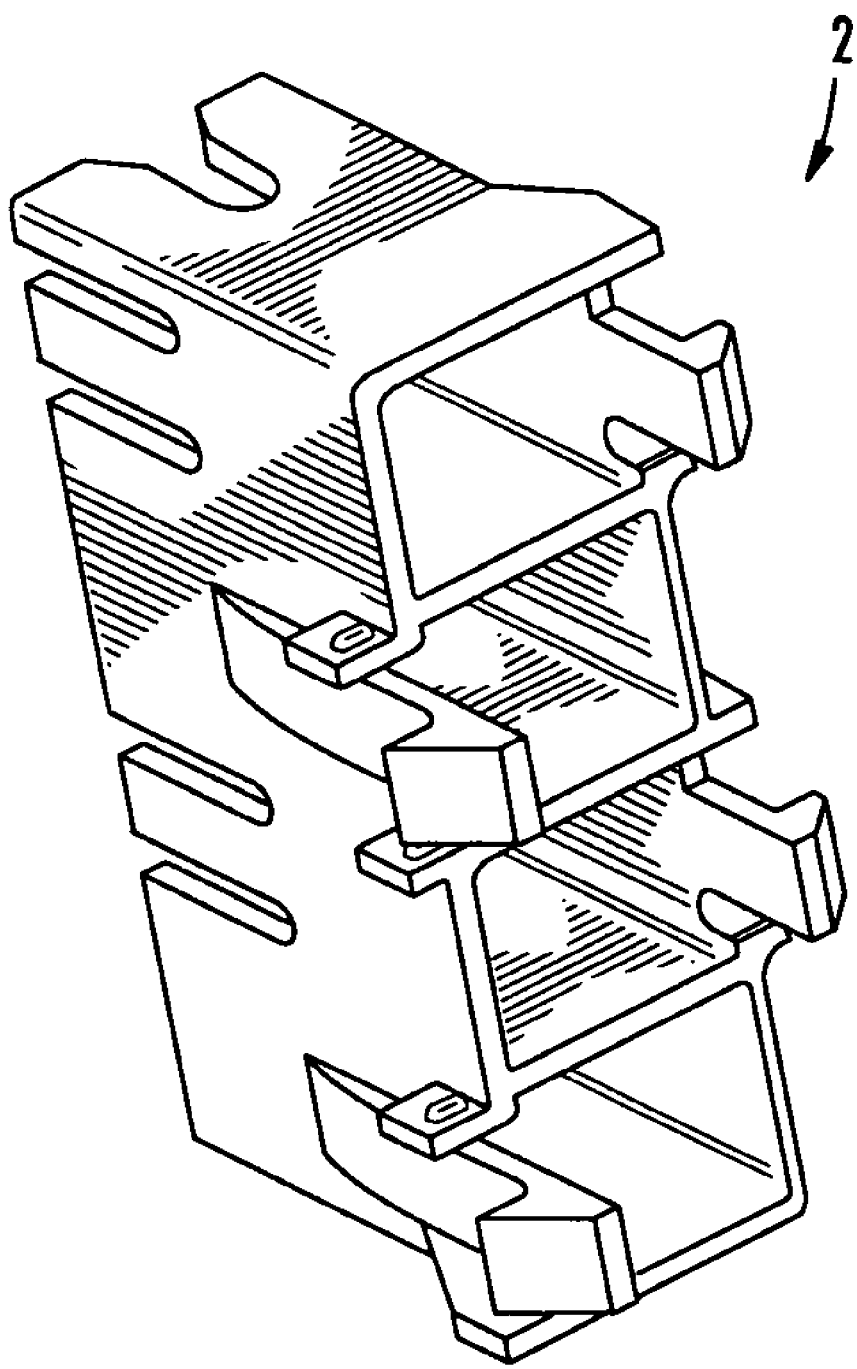
Figure 2:
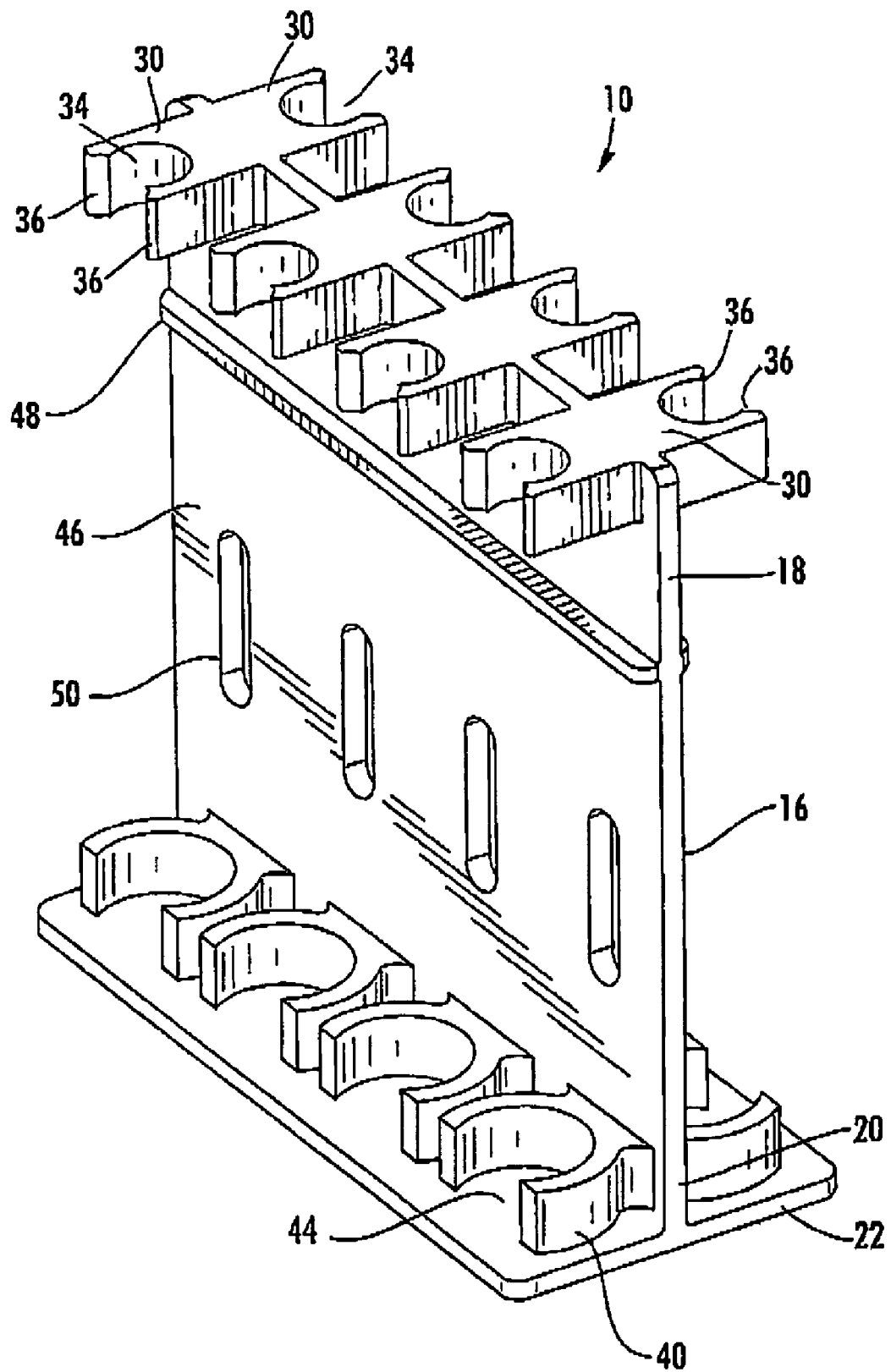
Figure 3:
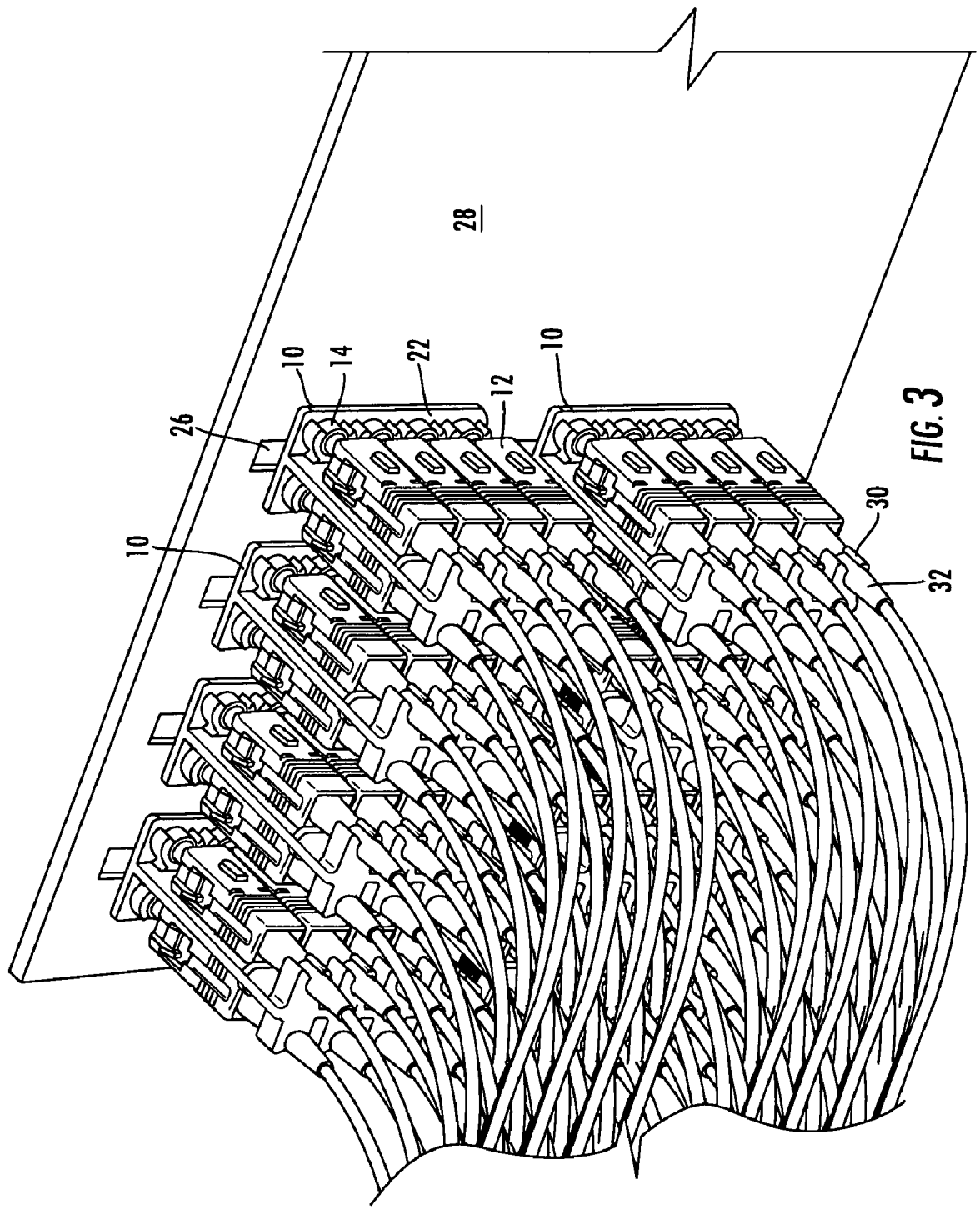
Figure 4:
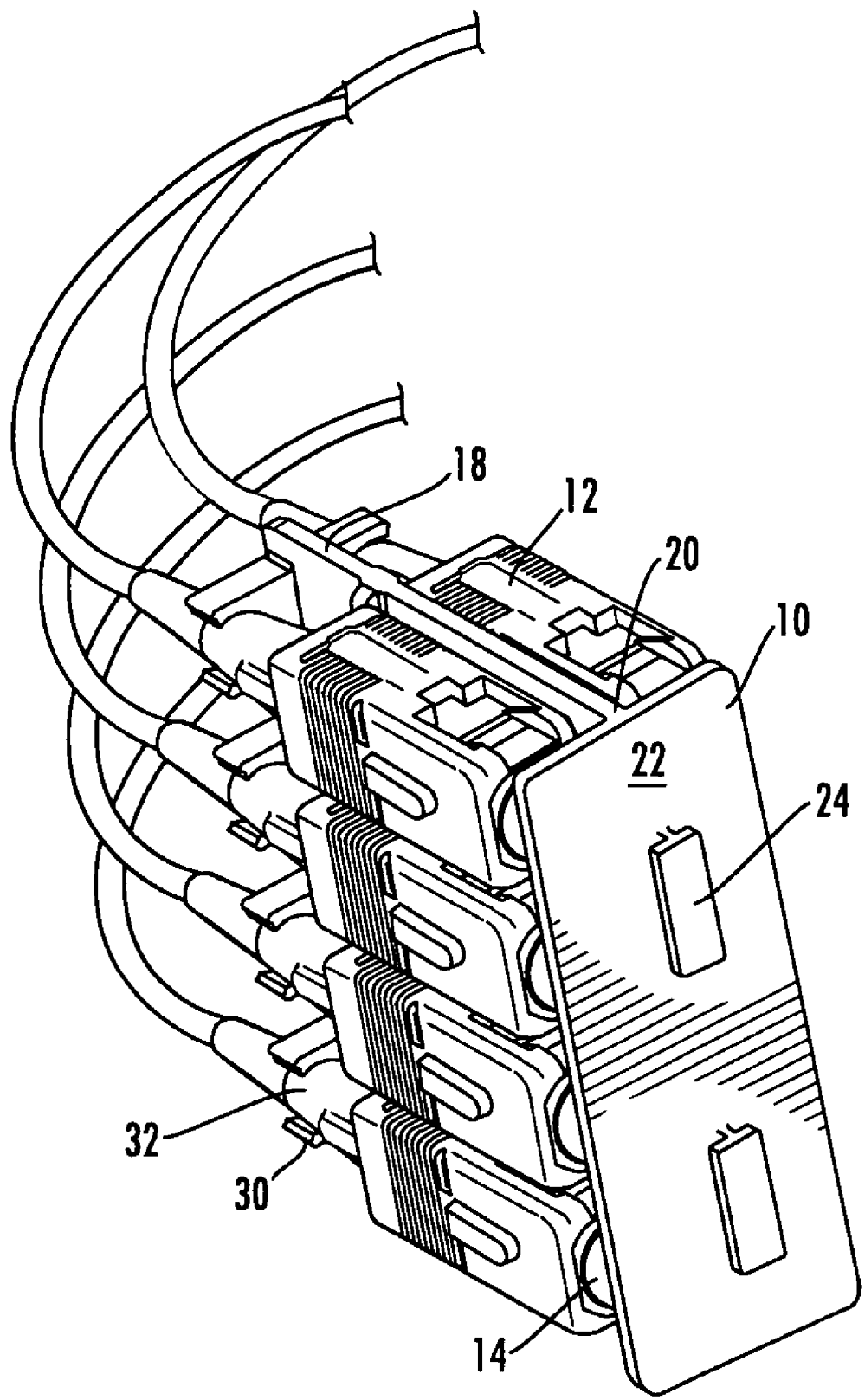
Figure 5:
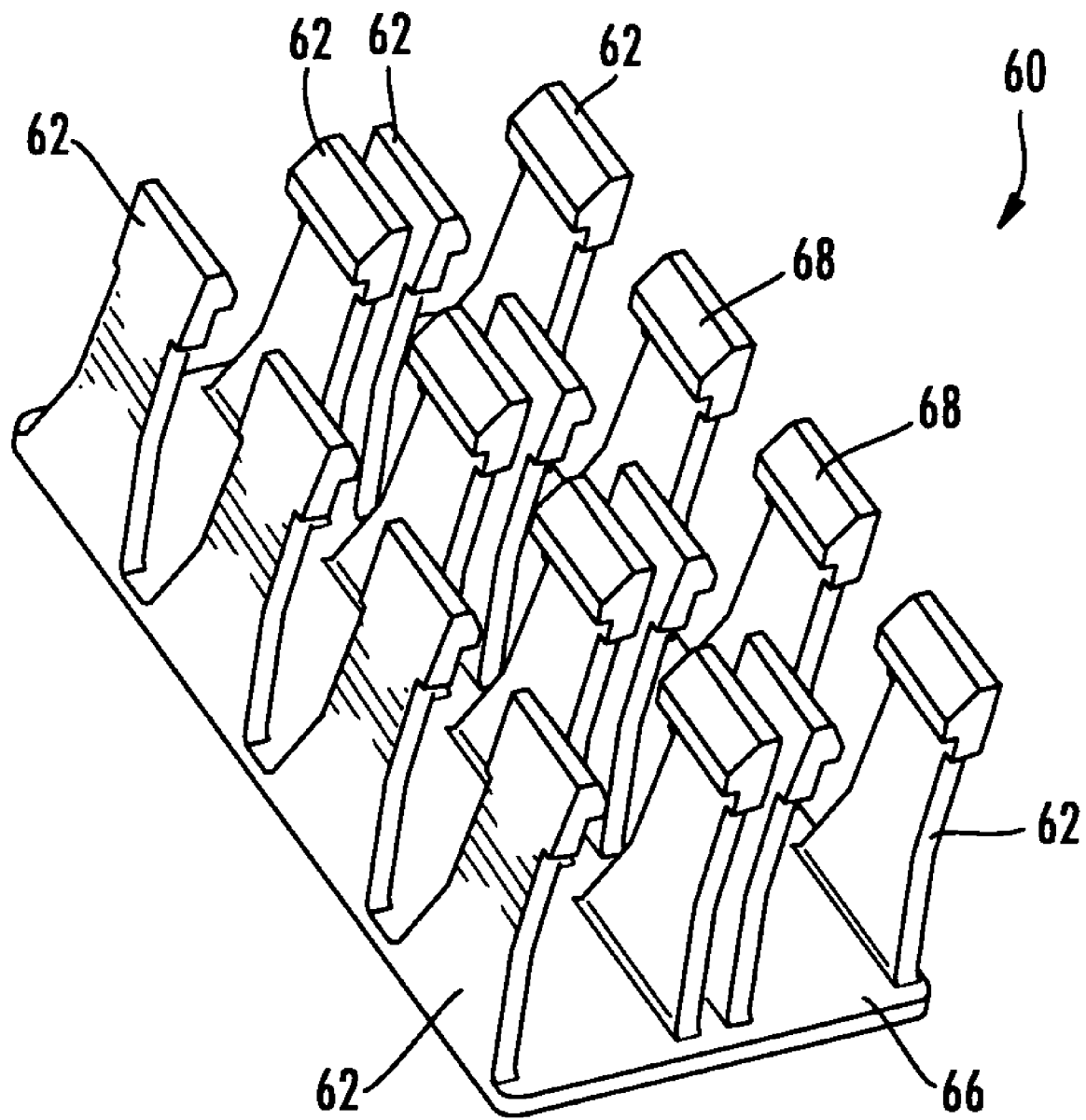
Figure 6A:
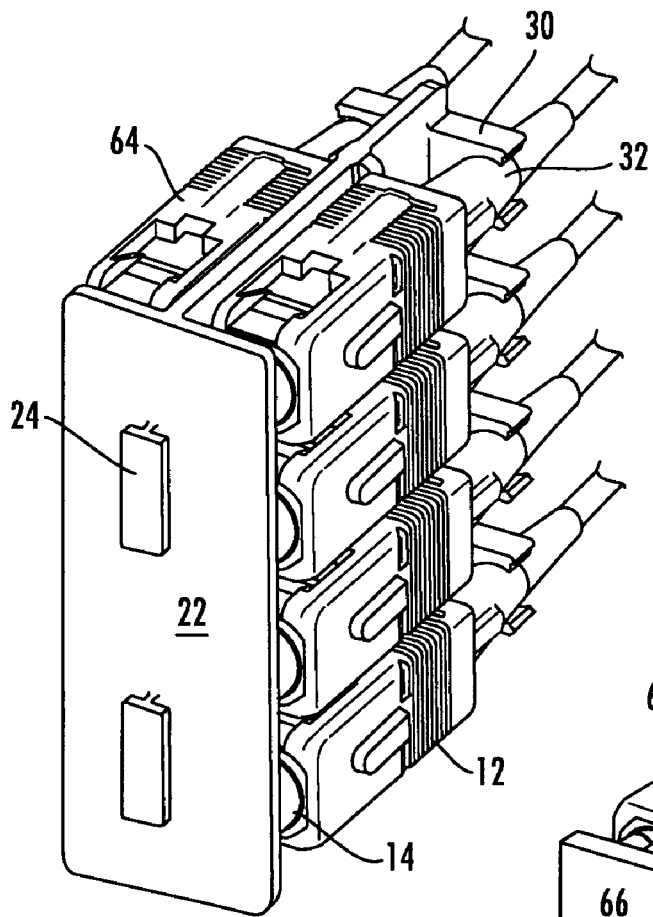
Figure 6B:
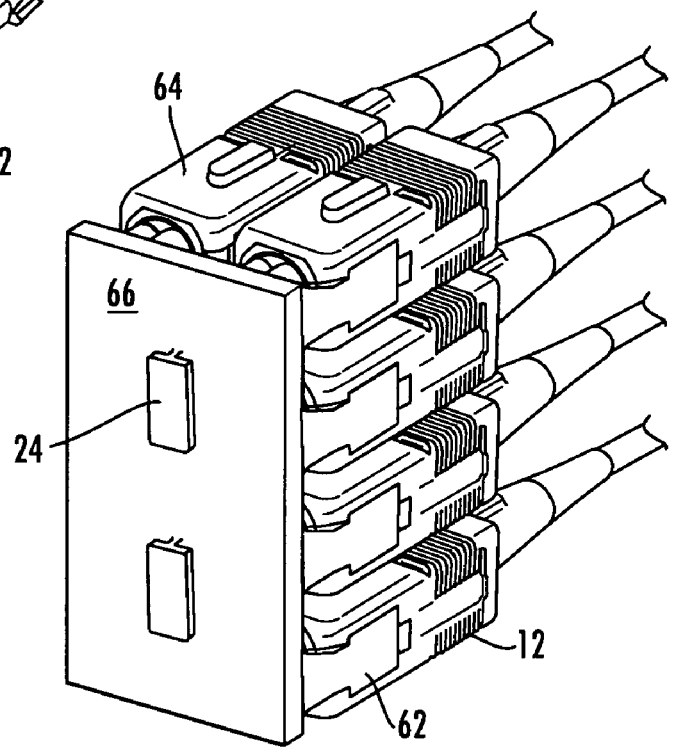
Figure 10B:
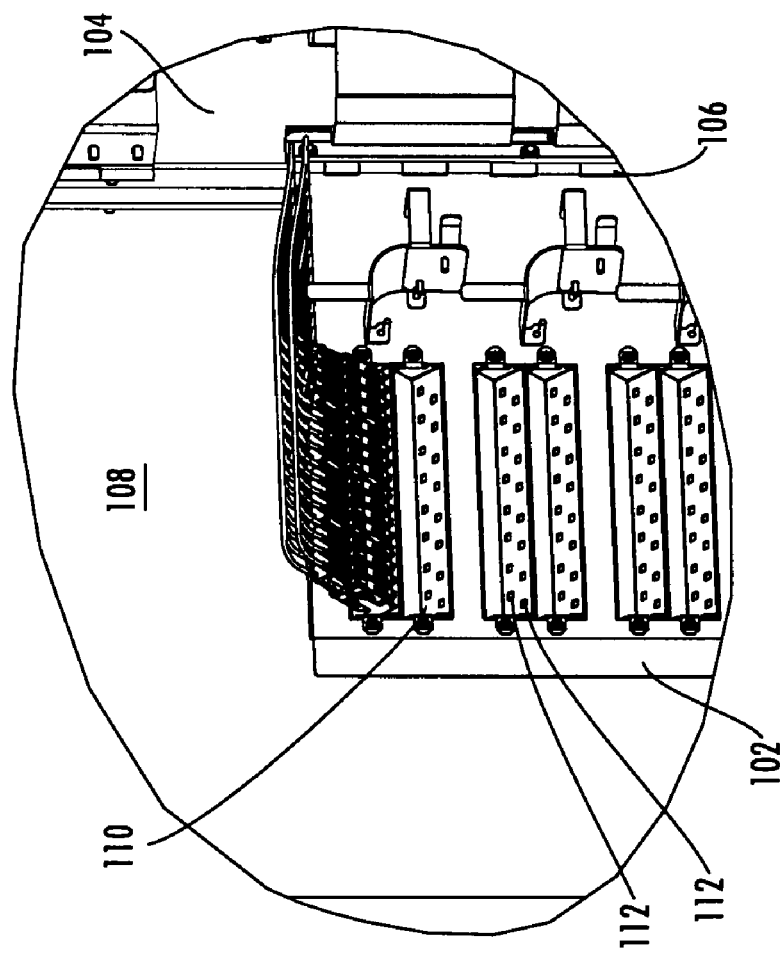
Figure 10A:
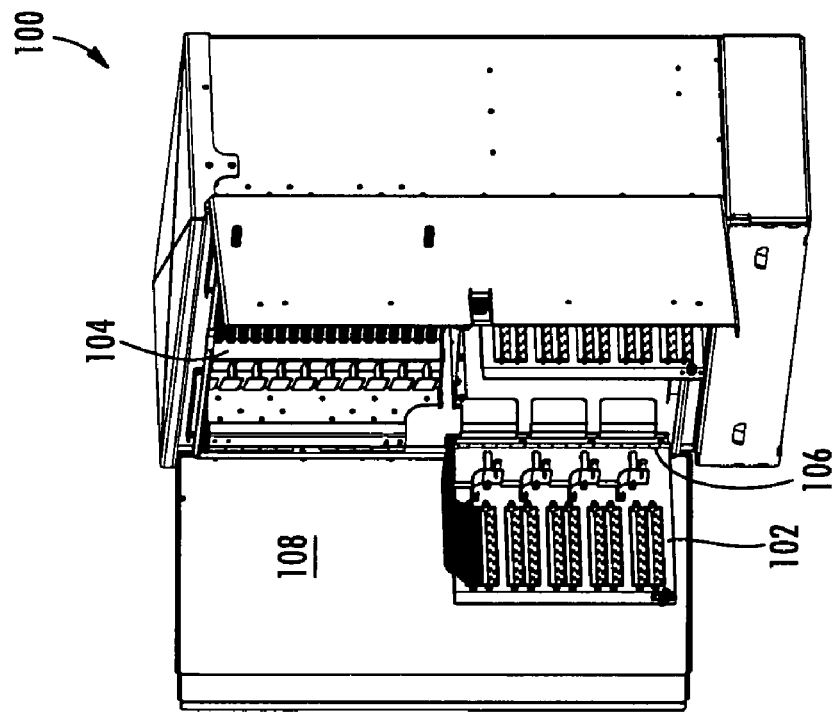
Figure 11B:
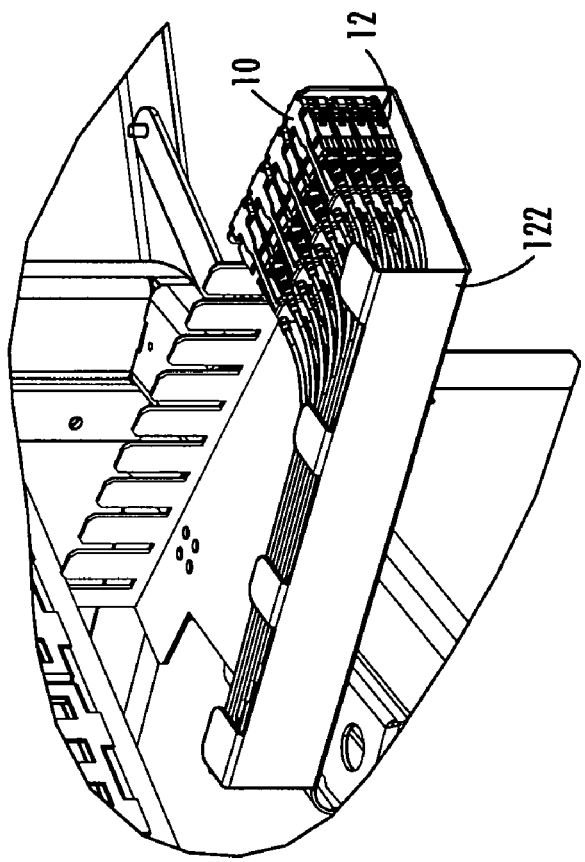
Figure 11A:
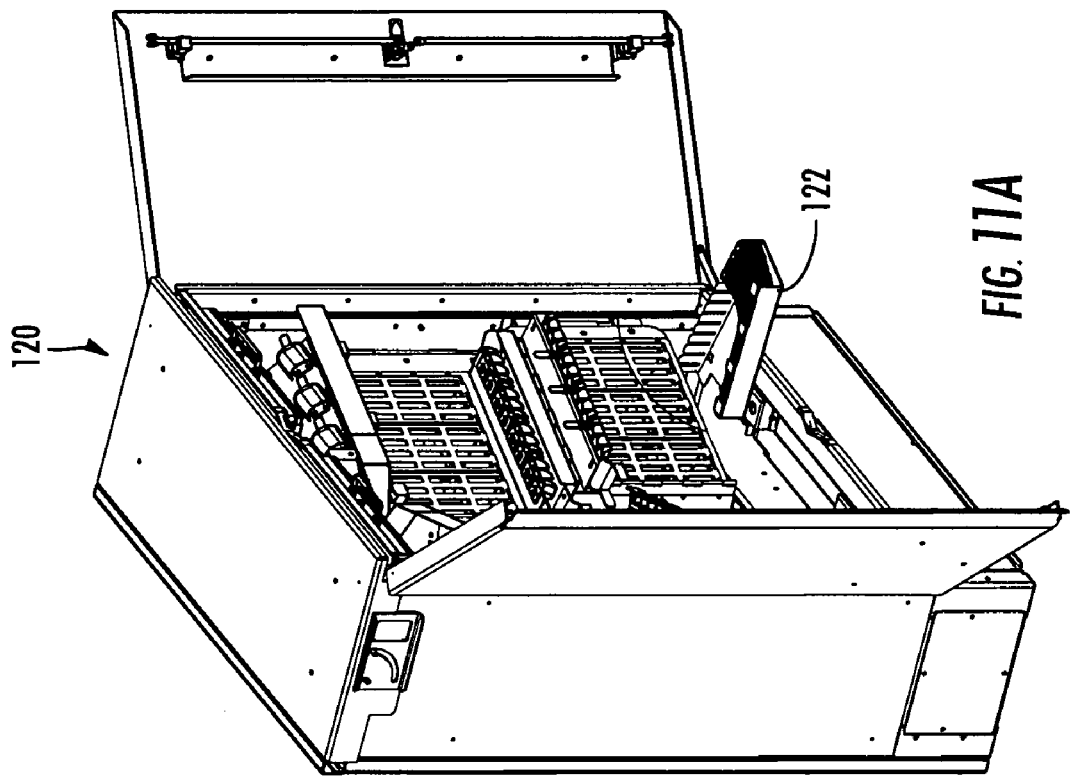

Having thus described the invention in general terms, reference will now be made to the accompanying drawings, which are not necessarily drawn to scale and are meant to be illustrative and not limiting, and wherein:

FIG. 1 is a perspective view of a prior art connector holder defining four openings adapted to selectively receive four fiber optic connectors;

FIG. 2 is a perspective view of a fiber optic connector holder in accordance with one embodiment of the present invention, wherein the connector holder is adapted to selectively retain a dust cap and/or the boot of a fiber optic connector;

FIG. 3 is a perspective view of a plurality of fiber optic connector holders in accordance with the embodiment illustrated in FIG. 2, wherein the fiber optic connector holders are fully populated with fiber optic connectors;

FIG. 4 is a perspective view of a fiber optic connector holder in accordance with the embodiment illustrated in FIG. 2, wherein the fiber optic connector holder includes two holder retainers defining T-tabs on a bottom surface of the base of the connector holder;

FIG. 5 is a perspective view of a fiber optic connector holder in accordance with a second embodiment of the present invention, wherein the connector holder comprises eight pairs of tabs adapted to selectively retain fiber optic connectors;

FIG. 6A is an alternative perspective view of the fiber optic connector holder of FIG. 4;

FIG. 6B is an alternative perspective view of a fiber optic connector holder in accordance with the embodiment illustrated in FIG. 5, wherein the fiber optic connector holders are fully populated with fiber optic connectors, and illustrating the fiber optic connectors oriented perpendicularly relative to the fiber optic connectors shown in FIG. 6A;

FIG. 7A is a side view of a fiber optic connector holder in accordance with a third embodiment of the present invention;

FIG. 7B is a front view of the fiber optic connector holder of FIG. 7A;

FIG. 7C is a perspective view of the fiber optic connector holder of FIG. 7A, wherein an upper portion of the connector holder defines an alternative structure, relative to the embodiment of FIG. 2, for selectively retaining the boot of a fiber optic connector and a lower portion of the connector holder defines an alternative structure, relative to the embodiment of FIG. 2, for selectively retaining the dust cap of a fiber optic connector, and where the fiber optic connector holder includes four holder retainers defining clips on a bottom surface of the base of the connector holder;

FIG. 7D is a bottom view of the fiber optic connector holder of FIG. 7A;

FIG. 7E is a perspective view of the fiber optic connector holder of FIG. 7A, illustrating the four holder retainers defining clips on the bottom surface of the base of the connector holder;

FIG. 8A-8C are perspective views of the fiber optic connector holder of FIGS. 7A-7E, illustrating one side of the connector holder fully populated (with four fiber optic connectors) to show the selective retention of the boot by the upper portion and of the dust cap by the lower portion;

FIG. 9 is a perspective view of a fiber optic connector holder of FIGS. 7A-7E, illustrating the connector holder fully populated (with eight fiber optic connectors) and illustrating the routing of the fiber optic cables from the respective fiber optic connectors;

FIG. 10A is a perspective view of a fiber optic closure, in particular a fiber distribution hub ("FDH"), adapted to review one or more fiber optic connector holders of the present invention, illustrating the connector holders mounted on a swing-out frame comprising a plurality of openings for receiving the holder retainers of the fiber optic connector holders of the type shown in FIGS. 7A-7E;

FIG. 10B is an enlarged perspective view of the FDH of FIG. 10A, illustrating the angled panels of the swing-out frame, wherein the angled panels define the plurality of openings for receiving the holder retainers of the fiber optic connector holders of the type shown in FIGS. 7A-7E;

FIG. 11A is a perspective view of a fiber optic closure, in particular a fiber distribution hub ("FDH"), adapted to review one or more fiber optic connector holders of the present invention, illustrating the connector holders mounted on a swing-out tray comprising a plurality of slots for receiving the holder retainers of the fiber optic connector holders of the type shown in FIG. 4;

FIG. 11B is an enlarged perspective view of the FDH of FIG. 10A, illustrating the swing-out tray, wherein the plurality of slots receive the holder retainers of the fiber optic connector holders of the type shown in FIG. 4;

FIG. 12A is a perspective view of a fiber optic connector holder in accordance with a fourth embodiment of the present invention, wherein the connector holder comprises a structure similar to the connector holder of FIGS. 7A-7E, but is adapted to hold only four fiber optic connectors on one side of the connector holder;

FIG. 12B is a front view of the fiber optic connector holder of FIG. 12A;

FIG. 12C is a side view of the fiber optic connector holder of FIG. 12A; and

FIG. 12D is a bottom view of the fiber optic connector holder of FIG. 12A.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for retaining fiber optic connectors are described and shown in the accompanying drawings with regard to specific types of fiber optic connector holders, it is envisioned that the functionality of the various apparatus and methods may be applied to any now known or hereafter devised fiber optic connectors in which it is desired to provide retention and/or parking when the fiber optic connector is not in use or otherwise connected in such a way to provide optical communication between a service provider and a subscriber. Like numbers refer to like elements throughout.

With reference to FIGS. 2-12D, fiber optic connector holders and telecommunications enclosures in accordance with various embodiments of the present invention are illustrated. The telecommunications enclosures described herein, such as with reference to FIGS. 10A-11B, are fiber distribution hubs ("FDHs"); however, the connector holders of further embodiments of the present disclosure may be used in any telecommunications enclosure that houses connectorized fiber optic cables that may be selectively disconnected from adapters or other receptacles. Non-limiting examples of such alternative enclosures include aerial terminals, pedestals, below grade closures, network interface devices, and the like. In addition, although the embodiments described herein are adapted to retain four or eight fiber optic connectors, it should be appreciated that any number of connectors may be retained by alternative connector holders of the present invention and that any number of connector holders may be used in telecommunications enclosures of the present invention. Furthermore, although the illustrated embodiments of the connector holders are adapted to receive round dust caps and round boots, further embodiments of the present invention are adapted to receive and retain dust caps and boots of any shape and size. Also, the fiber optic connectors described herein are conventional SC fiber optic connectors; however, further embodiments of the present invention include fiber optic connector holders adapted for use with any current or future fiber optic connectors, including but not limited to FC, LC, ST, MT, MPO, MTP, MT-RJ, and the like.

Turning now to FIGS. 2-4, a fiber optic connector holder 10 in accordance with one embodiment of the present invention is shown. The fiber optic connector holder 10 is adapted to selectively retain eight (four on each side) fiber optic connectors 12 that include dust caps 14 that generally protect a ferrule of the connector. The connector holder 10 comprises a body 16 having an upper portion 18 and a lower portion 20. A wall 46 generally joins the upper portion 18 and lower portion 20 along an axial direction that is generally aligned with the axis of the connector 12 (along the axis of the optical fiber through the connector); however, further embodiments of the present invention may define the upper and lower portions differently relative to the connectors and/or may define alternative structures of the body. A base 22 of the fiber optic connector holder 10 is defined in the lower portion 20 of the connector holder, and the base of the illustrated embodiment defines a plane that is generally perpendicular to the plane of the upper and lower portions 18 and 20.

The base 22 includes holder retainers 24 that generally extend from the base of the connector holder. The holder retainers 24, as best shown in FIG. 4, define T-tabs, wherein the T-tabs define a relatively thin portion closer to the base 22 and a relatively wide portion opposite the base such that the holder retainer may be retained by a slot 26 in a panel 28. The slot 26 of the panel 28 of FIG. 3 comprises at least a portion of the slot defining a width that is greater than the width of the thin portion of the T-tab but is less than the width of the wide portion opposite the base 22, such that the connector holder 10 is substantially restricted from movement in a direction perpendicular to the panel. The slot 26 of various embodiments of the present invention is generally vertical such that the lowermost holder retainer 24 contacts the end of the slot 26 so that gravity keeps the connector holder in the slot, and the connector holder can be selectively removed only by sliding the connector holder up relative to the slot. Still further embodiments of the present invention include alternative holder retainers, including but not limited to the holder retainers of FIGS. 7A-7E as described below, alternative panels, and/or alternative slots.

Turning again to the connector holder 10 of FIGS. 2-4, the connector holder defines a plurality of boot retainers 30 in the upper portion 18 of the body 16. As best shown in FIGS. 3 and 4, the boot retainer 30 is adapted to selectively retain at least a portion of the boot 32 of a fiber optic connector 12. As defined herein, the fiber optic connector includes the ferrule, connector body, and boot; however, further embodiments of the present invention include fiber optic connectors having additional and/or alternative components. The boot retainers 30 comprise a generally semi-circular opening 34 that defines a radius of curvature that is generally smaller than the radius of a portion of the boot 32 of the fiber optic connector 12 that is selectively received by the boot retainer. The difference between the radius of the boot retainer and the portion of the boot depends on number of factors, including but not limited to, the stiffness of the boot retainer material (the connector holders of the embodiments disclosed herein comprise a thermoplastic material; however, further embodiments comprise an elastomeric material, metals, and the like, or combinations thereof, to provide non-limiting examples), the stiffness of the boots of the connectors to be retained, the shape of the boots, the size of the passage for the boot to pass through into the opening, the desired retention force, and other factors. In addition, further embodiments of the present invention include boot retainers and/or boots that define non-circular shapes, and still further embodiments include boot retainer shapes that are different than the shape of the boot (polygonal boot retainer and circular boot, to provide one non-limiting example).

The boot retainer 30 of the illustrated embodiments are each protrusions that are generally perpendicular to the plane of the upper and lower portions 18 and 20 and are generally parallel to the base 22. The boot retainers 30 include lead-in portions 36 to enable convenient insertion of a connector boot 32 into the boot retainer opening 34. The boot retainers 30 define a vertical thickness (vertical along the plane of the upper and lower portions 18 and 20) sufficient to provide an adequate amount of engagement between the boot retainer and boot 32 to adequately retain the selectively inserted boot. The size, shape, thickness, orientation, and other parameters of the boot retainers of further embodiments of the present invention may be different based upon a number of factors including the desired orientation of a retained boot and the boot retainer, the orientation of the connector holder within the enclosure relative to the direction of gravity, and other similar considerations.

The connector holder 10 of FIGS. 2-4 also includes a plurality of dust cap retainers 40 in the lower portion 20 of the body 16. As best shown in FIGS. 3 and 4, the dust cap retainer 40 is adapted to selectively retain at least a portion of the dust cap 14 of a fiber optic connector 12. The dust cap 14 is typically provided with connectors 12 to generally protect the ferrule of the connector from scratches, damage, and/or the accumulation of dust or debris when the connector is not in use (the dust cap is typically removed when the connector is being used for optical signal transmission). The dust cap retainers 40 comprise a generally semi-circular opening 44 that defines a radius of curvature that is generally larger than the radius of a portion of the dust cap 14 of the fiber optic connector 12 that is selectively received by the dust cap retainer. The difference between the radius of the dust cap retainer 40 and the portion of the dust cap 14 is provided so that the dust cap is not retained by an interference fit with the dust cap retainer, but is rather retained in radial directions (relative to the axis of the fiber optic connector 12) by mere contact between the dust cap and dust cap retainer in one or more directions (particularly the direction of gravity), as the connector (and dust cap, which generally has an interference fit with the ferrule) is generally retained in an axial direction by the contact between the boot retainer and the boot. However, further embodiments of the present invention include dust cap retainers that have different shapes, sizes, and or materials that contact the dust cap in an alternative fashion (one non-limiting example being an elastomeric dust cap retainer that provides an interference fit with the dust cap) to retain the dust cap and/or connector.

The dust cap retainers 40 of the illustrated embodiments are each protrusions that, like the boot retainers 30, are generally perpendicular to the plane of the upper and lower portions 18 and 20 and are generally parallel to the base 22, such that the dust cap retainers and the boot retainers are generally parallel to one another and define openings with central axes that are generally parallel and/or substantially aligned. Although the illustrated embodiment of FIGS. 2-4 includes dust cap retainers 40 without lead-in portions similar to the lead-in portions 36 of the boot retainers 30, alternative embodiments of the connector holder do include such lead-in portions. In addition, the dust cap retainers 40 define a vertical thickness (vertical along the plane of the upper and lower portions 18 and 20) sufficient to provide an adequate amount of contact between the dust cap retainer and a dust cap 14 to adequately retain the selectively inserted dust cap. The dust cap retainers 40 of the illustrated embodiments are in direct contact with the base 22 of the connector holder 10 such that axial movement of the retained dust cap in the direction of the base is restricted when the respective connector is retained by the connector holder. The size, shape, thickness, orientation, position, and other parameters of the dust cap retainers of further embodiments of the present invention may be different based upon a number of factors including the desired orientation of a retained dust cap and the dust cap retainer, the orientation of the connector holder within the enclosure relative to the direction of gravity, and other similar considerations. In addition, further embodiments of the present invention include dust cap retainers that selectively retain the connector body and/or the dust cap, including such dust cap retainers that contact only the connector body while providing space for the dust cap to remain on the retained connector.

In the embodiment of FIGS. 2-4, the boot retainer 30 and the dust cap retainer 40 are connected to and separated by a wall 46 that is generally perpendicular to the base 22. The wall 46 defines front and back sides, such that connectors 12 may be held on both the front side and back side; however, further embodiments of the present invention, such as the connector holder 42 of FIGS. 12A-12D, allow retention of connectors on only one side of the wall. Still further embodiments of the present invention include connector holders with one or more walls that allow retention of connectors on more than two sides. Returning again to the wall 46 of FIGS. 2-4, the wall 46 includes at least one rib 48 that is generally parallel to the base 22 and extends outwardly from the wall a predetermined distance so that the rib may contact a retained connector 12 (either the connector body, boot, and/or dust cap) to provide further stability to retained connectors. In addition, the wall 46 of FIGS. 2-4 includes an aperture 50 located between each pair of boot retainer 30 and dust cap retainer 40 to allow a technician to see connectors 12 retained on the opposite side of the wall (depending upon the technician's vantage point) and/or to reduce the weight and/or material costs of the connector holder 10 without adversely affecting the structural properties of the connector holder. Further embodiments of the present invention include walls and/or other structures that include additional and/or alternative features to improve the performance and/or cost of the connector holder.

The present invention also provides methods for organizing fiber optic connectors within the telecommunications enclosure, particularly when the connectors are disconnected from the respective adapters, such as the adapters of a distribution field, and while dust caps are provided on the adapters. A connector holder, such as the connector holder 10 of FIGS. 2-4, is provided within an interior cavity of a telecommunications enclosure, such as an FDH. A technician wanting to retain one or more fiber optic connectors in an organized fashion, including the use of reference numbers to associate with the fiber optic connectors (the numbers may be provided on the connector holder and/or the panel to which the connector holder is joined), would first position the dust cap of the fiber optic connector within the dust cap retainer of the connector holder such that the dust cap is selectively retained by the dust cap retainer, which in the embodiment of FIGS. 2-4 retains the dust cap by generally restricting movement of the dust cap in a radial direction relative to the axis of the connector. Once the dust cap has been positioned within the dust cap retainer, the technician then generally rotates the connector such that a portion of the boot is selectively inserted into the boot retainer such that the boot is selectively retained by the boot retainer. Thus the connector is held by the connector holder and the technician is free to handle other fiber management duties and/or other tasks while the connector is held by the connector holder for an indefinite period of time. To remove the connector from the connector holder, the technician must simply grasp the connector body and generally rotate the connector with a sufficient force to disengage the boot from the boot retainer and then retract the connecter a sufficient amount so that the dust cap is clear of the dust cap retainer, and then the technician is free to move the connector as pleased. Further embodiments of the present invention having connector holders with alternative shapes, features, and the like compared to the embodiment of FIGS. 2-4 may include additional and/or alternative steps when selectively retaining and/or removing the connectors.

Turning now to the fiber optic connector holder 60 of FIGS. 5 and 6B, rather than retaining the fiber optic connectors 12 by the boot 32 and/or dust cap 14, the connector holder 60 retains the connectors with a pair of clamping devices 62 that are adapted to exert opposing forces on the connector body 64 and thereby retain the connector relative to the connector holder. The clamping devices 62 of the illustrated embodiment comprise clips that extend in a generally perpendicular direction relative to the base 66 and are spaced apart a predetermined distance generally based upon the thickness of the connector body 64 to be retained (taking into consideration the relative orientation of the connector body, as the connector body may define different thicknesses in different directions). The clamping devices 62, in the illustrated embodiment, include a stepped portion adapted to interact with the connector body 64 to provide additional axial retention of the connector. The clamping devices 62 also include lead-in portions 68 at an end generally opposed to the base 66 so that a technician can more easily insert the connector body 64 between the pair of clamping devices. The length of the clamping devices 62 is such that the clamping devices are able to sufficiently retain the connector body while providing enough distance for the dust cap 14 to remain on the connector 12 while the connector is retained. Although the illustrated embodiment of the connector holder 60 comprises eight pairs of clamping devices 62 to selectively retain eight fiber optic connectors 12, further embodiments of the present invention include any number of clamping devices adapted to receive any number of fiber optic connectors and are located at any position on the base.

Referring now to the fiber optic connector holder 70 of FIGS. 7A-7E, is similar to the connector holder 10 of FIGS. 2-4, but has alternative structures for the boot retainers 72, the dust cap retainers 74, holder retainers 76, and wall 78. The boot retainers 72 of the connector holder 70 of FIGS. 7A-7E are generally joined together to increase the structural strength of the collection of boot retainers, relative to the generally unjoined boot retainers 30 of FIGS. 2-4. The dust cap retainers 74 of the connector holder 70 of FIGS. 7A-7E each comprise a groove 80 defining a width generally larger than a diameter of the dust cap 14 of the fiber optic connector 12 that is selectively received by the dust cap retainer 74. In addition, the groove 80 of the dust cap retainers 74 comprise one or more angled portions 82 that decreases the width of the groove as the groove generally extends away from the center of the lower portion (away from the wall 78). The angled portion 82 is positioned a distance from the wall 78 adequate to allow the dust cap 14 to fit within the groove while generally preventing the dust cap from sliding, rotating, or otherwise moving out of the groove while the boot 32 is retained by the boot retainer 72. Accordingly, to retain a connector 12 in the connector holder 70, the dust cap 14 may be inserted into the groove 80 between the angled portion 82 and the wall 78 and then the connector rotated until the boot 32 is inserted into and retained by the boot retainer 72. Further embodiments of the present invention include dust cap retainers having alternative groove and/or angled portion structures for selectively retaining the dust caps of fiber optic connectors.

The wall 78 of the connector holder 70 also includes different features than the wall 46 of the connector holder 10 of FIGS. 2-4. The wall of connector holder 70 of FIGS. 7A-7E does not include a rib or apertures, but alternatively includes channel dividers 84 extending generally from the upper portion 86 of the connector holder to the lower portion 88 of the body of the connector holder. The channel dividers 84 may extend outwardly from the wall any desired amount, depending in part upon the particular connector to be retained, and the channel dividers are generally located between adjacent boot retainers 72 and between adjacent dust cap retainers 74 such that the channel dividers generally separate the individual boot retainer-dust cap retainer pairs.

The holder retainers 76 of the connector holder 70 of FIGS. 7A-7E comprises four clips that include a hooked portion 90 such that when the holder retainers are selectively inserted into openings of a panel, as discussed below, the hooked portion acts upon an opposite side of the panel to generally prevent the holder retainer from exiting the opening and thereby retains the connector holder relative to the panel. The base 92 of the connector holder 70 also comprises stepped portions 94 located generally between the holder retainers 76, such that the stepped portions are adapted to engage the panel to which the connector holder is selectively received while allowing the holder retainers to define a predetermined length that enables the holder retainers to bend or otherwise move a distance sufficient to allow the holder retainer to be inserted into the openings of the panel and then regain their original position relative to the base 92 of the connector holder and thereby enable the hooked portions 90 to act upon the opposite side of the panel.

Turning now to the FDH 100 of FIGS. 10A and 10B, the FDH 100 includes a swing-out frame 102 within an interior cavity 104 of the FDH. The swing-out frame 102 includes a generally vertical hinge 106 that allows the swing-out frame to selectively swing outwardly and generally toward a technician when an external door 108 of the FDH 100 is opened. The swing-out frame 102 defines one or more panels 110 that are adapted to selectively retain the holder retainers 76 of the fiber optic connector holders 70 to join the fiber optic connector holder to the panel. The panel 110 is defined at an angle relative to the vertical axis of the FDH such that the joined fiber optic connector holders 70 are similarly angled to thereby enable technicians to more easily insert and remove the connectors 12 from the connector holders. The panel 110 defines a plurality of openings 112 that are sized to selectively receive the holder retainers 76 of the connector holders 70 in the manner described above. Therefore, the FDH 100 can be originally populated with a desired number of connector holders 70 retaining no connectors 12 or any number of connectors. The FDH 100 can also be originally populated with no connector holders 70, but as the fiber optic cables with connectors are added to the FDH, the new connectors 12 may be supplied pre-loaded into connector holders such that a technician, when initially installing a module, such as a splitter module to provide one non-limiting example, will be able to selectively insert the connector holder(s) directly into the panel and will not need to insert each connector into the connector holder(s), thus saving the technician time in the telecommunications enclosure and reducing the likelihood that the connectors and/or other hardware might be damaged or disturbed in the connector-inserting process. Still other advantages are provided by the various embodiments of the present invention.

The FDH 120 of FIGS. 11A and 11B includes a swing-out tray 122 that defines one or more slots 124 for selectively receiving the holder retainers 24 of fiber optic connector holders 10 of the type illustrated in FIGS. 2-4. The swing-out tray 122 of FIGS. 11A and 11B generally serves the same function as the swing-out frame 102 of FIGS. 10A and 10B; however, the swing-out tray is smaller and may be more suited for telecommunications enclosures that do not include swing-out frames. The swing-out tray 122 allows a technician to conveniently remove the connector holder 10 from the tray in order to insert and/or remove connectors 12 from the connector holder. Therefore, various embodiments of the present invention provide for convenient retention of fiber optic connectors within telecommunications enclosures, and some embodiments allow retention of up to twice as many connectors for a given volume relative to conventional connector holder.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

That which is claimed:

1. A fiber optic connector holder adapted to selectively retain two or more fiber optic connectors that include a dust cap generally protecting a ferrule of the connector, the connector holder comprising:

a body comprising an upper portion and a lower portion, wherein the lower portion of the body defines a base of the fiber optic connector holder;

a plurality boot retainers defined by the upper portion of the body, wherein at least one of the plurality of boot retainers is adapted to selectively retain at least a portion of a boot of a fiber optic connector;

a plurality of dust cap retainers defined by the lower portion of the body, wherein at least one of the plurality of dust cap retainers is adapted to selectively retain at least a portion of the dust cap generally protecting the ferrule of the connector; and a holder retainer generally extending from the base of the fiber optic connector holder.

2. A connector holder according to claim 1, wherein at least one of the plurality of dust cap retainers comprises a generally semi-circular opening defining a radius of curvature generally larger than a radius of the dust cap of the fiber optic connector that is selectively received by the at least one of the dust cap retainers.

3. A connector holder according to claim 1, wherein the holder retainer comprises at least one T-tab.

4. A connector holder according to claim 1, wherein the holder retainer comprises two or more clips.

5. A fiber optic connector holder adapted to selectively retain two or more fiber optic connectors that include a dust cap generally protecting a ferrule of the connector, the connector holder comprising;

a body comprising an upper portion and a lower portion, wherein the lower portion of the body defines a base of the fiber optic connector holder;

a boot retainer defined by the upper portion of the body, wherein the boot retainer is adapted to selectively retain at least a portion of a boot of a fiber optic connector;

a dust cap retainer defined by the lower portion of the body, wherein the dust cap retainer is adapted to selectively retain at least a portion of the dust cap generally protecting the ferrule of the connector, wherein the body defines a front side and a back side, and wherein both the front side and the back side comprise at least one boot retainer and at least one dust cap retainer; and a holder retainer generally extending from the base of the fiber optic connector holder.

6. A fiber optic connector holder adapted to selectively retain two or more fiber optic connectors that include a dust cap generally protecting a ferrule of the connector, the connector holder comprising:

a body comprising an upper portion and a lower portion, wherein the lower portion of the body defines a base of the fiber optic connector holder;

a boot retainer defined by the upper portion of the body, wherein the boot retainer is adapted to selectively retain at least a portion of a boot of a fiber optic connector;

a dust cap retainer defined by the lower portion of the body, wherein the dust can retainer is adapted to selectively retain at least a portion of the dust cap generally protecting the ferrule of the connector, wherein the body defines channel dividers extending generally from the upper portion to the lower portion of the body, and wherein the channel dividers are generally located between adjacent boot retainers and between adjacent dust cap retainers; and a holder retainer generally extending from the base of the fiber optic connector holder.

7. A fiber optic connector holder adapted to selectively retain two or more fiber optic connectors that include a dust can generally protecting a ferrule of the connector, the connector holder comprising:

a body comprising an upper portion and a lower portion, wherein the lower portion of the body defines a base of the fiber optic connector holder;

a boot retainer defined by the upper portion of the body, wherein the boot retainer is adapted to selectively retain at least a portion of a boot of a fiber optic connector, wherein the boot retainer comprises a generally semi-circular opening defining a radius of curvature generally smaller than a radius of the portion of the boot of the fiber optic connector that is selectively received by the boot retainer;

a dust cap retainer defined by the lower portion of the body, wherein the dust can retainer is adapted to selectively retain at least a portion of the dust cap generally protecting the ferrule of the connector; and a holder retainer generally extending from the base of the fiber optic connector holder.

8. A fiber optic connector holder adapted to selectively retain two or more fiber optic connectors that include a dust cap generally protecting a ferrule of the connector, the connector holder comprising:

a body comprising an upper portion and a lower portion, wherein the lower portion of the body defines a base of the fiber optic connector holder;

a boot retainer defined by the upper portion of the body, wherein the boot retainer is adapted to selectively retain at least a portion of a boot of a fiber optic connector;

a dust cap retainer defined by the lower portion of the body, wherein the dust can retainer is adapted to selectively retain at least a portion of the dust can generally protecting the ferrule of the connector, wherein the dust cap retainer comprises a groove defining a width generally larger than a diameter of the dust cap of the fiber optic connector that is selectively received by the dust cap retainer; and a holder retainer generally extending from the base of the fiber optic connector holder.

9. A connector holder according to claim 8, wherein the groove of the dust cap retainer comprises at least one angled portion that decreases the width of the groove as the groove generally extends away from a center of the lower portion.

10. A telecommunications enclosure comprising a distribution field of two or more adapters and comprising two or more connectorized fiber optic cables adapted for selective insertion into the adapters, wherein the connectorized fiber optic cables selectively include a dust cap that generally protects a ferrule of the connector, the telecommunications enclosure comprising comprising:

a panel within an interior cavity of the telecommunications enclosure; and at least one fiber optic connector holder joined to the panel, the fiber optic connector holder comprising:

a body comprising an upper portion and a lower portion, wherein the lower portion of the body defines a base of the fiber optic connector holder;

a boot retainer defined by the upper portion of the body, wherein the boot retainer is adapted to selectively retain at least a portion of a boot of a fiber optic connector;

a dust cap retainer defined by the lower portion of the body, wherein the dust cap retainer is adapted to selectively retain at least a portion of the dust cap generally protecting the ferrule of the connector; and a holder retainer generally extending from the base of the fiber optic connector holder;

wherein the panel is adapted to selectively retain the holder retainer of the fiber optic connector holder to join the fiber optic connector holder to the panel.

11. A telecommunications enclosure according to claim 10, wherein the panel is defined on a swing-out frame.

12. A telecommunications enclosure according to claim 10, wherein the panel is defined on a swing-out way.

13. A telecommunications enclosure according to claim 10, wherein the telecommunications enclosure defines a vertical axis and wherein the panel is defined at an angle relative to the vertical axis of the telecommunications enclosure.

14. A telecommunications enclosure according to claim 10, wherein the panel defines the plurality of openings for selectively receiving the holder retainer of the fiber optic connector bolder.

15. A telecommunications enclosure according to claim 10, wherein the panel defines at least one slot for selectively receiving the holder retainer of the fiber optic connector holder.

16. A method of organizing at least one fiber optic connector within a telecommunications enclosure, wherein the fiber optic connector is disconnected from a fiber optic adapter and includes a dust cap that generally protects a ferrule of the connector, the method comprising:

providing a fiber optic connector holder within an interior cavity of the telecommunications enclosure, wherein the connector holder defines a boot retainer and a dust cap retainer;

positioning the dust cap within the dust cap retainer of the fiber optic connector holder such that the dust cap is selectively retained by the dust cap retainer; and selectively inserting a portion of a boot of the fiber optic connector into the boot retainer such that the boot is selectively retained by the boot retainer.

17. A method according to claim 16, wherein positioning the dust cap and selectively inserting the boot is performed by grasping a connector body of the fiber optic connector, wherein the connector body is located between the dust cap and the boot 18. A method according to claim 16, wherein providing a fiber optic connector holder comprises selectively inserting a holder retainer of the connector holder into at least one of a slot and an opening defined by a panel of the telecommunications enclosure.

19. A method according to claim 16, wherein providing a fiber optic connector holder comprises providing the connector holder on at least one of a swing-out frame and a swing-out tray.

* * * * *